(12) United States Patent
Faik

(10) Patent No.: US 11,648,764 B2
(45) Date of Patent: May 16, 2023

(54) APPARATUS TO FORM AND ASSEMBLE A FLEXIBLE COVER ON A CARRIER

(71) Applicant: Faurecia Innenraum Systeme GmbH, Hagenbach (DE)

(72) Inventor: Othmane Faik, La Wantzenau (FR)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 248 days.

(21) Appl. No.: 15/969,475

(22) Filed: May 2, 2018

(65) Prior Publication Data
US 2018/0319144 A1 Nov. 8, 2018

(30) Foreign Application Priority Data
May 3, 2017 (DE) .................. 10 2017 207 452.3

(51) Int. Cl.
| | | |
|---|---|---|
| B32B 37/12 | (2006.01) | |
| B65G 49/06 | (2006.01) | |
| B32B 38/18 | (2006.01) | |
| B32B 17/06 | (2006.01) | |

(Continued)

(52) U.S. Cl.
CPC ............. *B32B 37/12* (2013.01); *B32B 17/06* (2013.01); *B32B 38/0012* (2013.01); *B32B 38/1866* (2013.01); *B65G 49/061* (2013.01); *B65G 49/066* (2013.01); *B32B 38/1858* (2013.01); *B32B 2037/1253* (2013.01); *B32B 2605/003* (2013.01); *B65G 2249/04* (2013.01); *C03B 23/0302* (2013.01)

(58) Field of Classification Search
CPC ..... B32B 37/12; B32B 38/1866; B32B 17/06; B32B 38/0012; B32B 2037/1253; B32B 38/1858; B32B 2605/003; B32B 17/10018; B65G 49/066; B65G 49/061; B65G 2249/04; C03B 23/0302; C03B 23/03; B29C 65/48; B60J 1/00
See application file for complete search history.

(56) References Cited

U.S. PATENT DOCUMENTS

| | | | |
|---|---|---|---|
| 3,363,040 A | 1/1968 | Katashi | |
| 5,044,918 A * | 9/1991 | Brussel | ................... B29C 43/36 |
| | | | 425/444 |
| 2002/0197344 A1 | 12/2002 | Takahashi | |

(Continued)

FOREIGN PATENT DOCUMENTS

| | | |
|---|---|---|
| CA | 2956049 A1 | 5/2016 |
| CN | 101720308 A | 6/2010 |

(Continued)

*Primary Examiner* — Michael N Orlando
*Assistant Examiner* — Christopher W Raimund
(74) *Attorney, Agent, or Firm* — Faegre Drinker Biddle & Reath LLP

(57) ABSTRACT

The present disclosure relates to a method for manufacturing a bent component. The present disclosure moreover relates to a shaping tool for manufacturing a bent component. The shaping tool comprises a first tool half, a second tool half and at least one movable cylinder pin. The first tool half of the shaping tool is arranged opposite the second half of the shaping tool. An outer end of the at least one cylinder pin herein points in the direction of the second half of the shaping tool. A holding element for receiving a flat bendable element is assembled on this outer end of the at least one cylinder pin.

7 Claims, 5 Drawing Sheets

(51) Int. Cl.
  *B32B 38/00* (2006.01)
  *C03B 23/03* (2006.01)

(56) References Cited

U.S. PATENT DOCUMENTS

| | | |
|---|---|---|
| 2005/0276874 A1 | 12/2005 | Menaldo et al. |
| 2009/0000334 A1 | 1/2009 | Boisselle et al. |
| 2011/0265517 A1 | 11/2011 | Keebler et al. |
| 2013/0183530 A1 | 7/2013 | Ogawa et al. |
| 2013/0216757 A1* | 8/2013 | Fox .................. B29C 43/361 428/58 |
| 2014/0199153 A1* | 7/2014 | Reinhold ............ B65H 3/0816 414/800 |
| 2015/0307034 A1 | 10/2015 | Musy et al. |
| 2017/0217820 A1 | 8/2017 | Balduin et al. |
| 2018/0178424 A1 | 6/2018 | Faik et al. |

FOREIGN PATENT DOCUMENTS

| | | | |
|---|---|---|---|
| CN | 103261952 A | 8/2013 | |
| CN | 103785772 A | 5/2014 | |
| CN | 105034970 A | 11/2015 | |
| DE | 3345626 A1 | 6/1985 | |
| DE | 10004735 A1 | 8/2001 | |
| DE | 10152232 A1 | 5/2003 | |
| DE | 102006038013 A1 | 2/2008 | |
| DE | 102011050102 A1 * | 11/2012 | ............. B29C 70/54 |
| DE | 102011050102 A1 | 11/2012 | |
| DE | 102014008665 A1 | 12/2015 | |
| DE | 102014008665 A1 * | 12/2015 | .......... B25J 15/0061 |
| DE | 102015219094 A1 | 4/2017 | |
| JP | 07-088228 A | 4/1995 | |
| JP | 2000-079626 A | 3/2000 | |
| JP | 2005-060063 A | 3/2005 | |
| WO | WO9206835 A1 | 4/1992 | |
| WO | 2016024029 A1 | 2/2016 | |

* cited by examiner

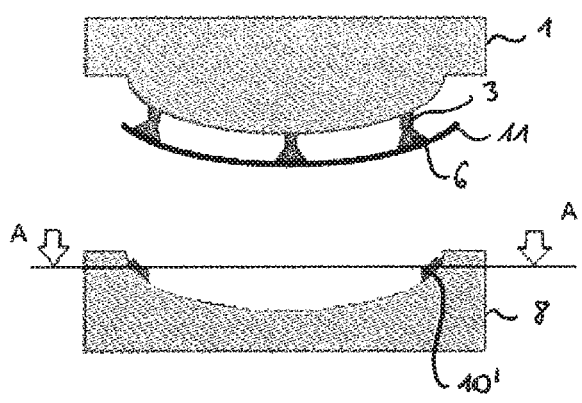
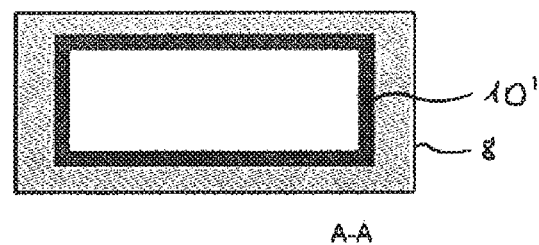
Fig. 9a
Fig. 9b

APPARATUS TO FORM AND ASSEMBLE A FLEXIBLE COVER ON A CARRIER

CROSS-REFERENCE TO RELATED APPLICATION

This application claims priority to German Application No. 10 2017 207 452.3, filed May 3, 2017, which is herein incorporated by reference in its entirety.

TECHNICAL FIELD

The present disclosure relates to a method for manufacturing a component for use in a vehicle interior. The present disclosure moreover relates to a shaping tool for manufacturing a corresponding component.

BACKGROUND

Concerning known methods for manufacturing a component for use in a vehicle interior, out of a flat element, the flat element, for example a plastic plate is firstly preshaped. The preshaped element in such a preshaped condition is inserted into a further tool and is connected to a carrier element, so that the preshaped element is stabilised in its shape and is possibly connected to further function elements. Herein, the process step of the preshaping is carried out with a tool which is different to when connecting the preshaped element to the carrier part.

SUMMARY

Starting from this state of the art, it is the object of the present disclosure to suggest an improved method for manufacturing a component. In particular, a comparable, inexpensive method is to be suggested, by way of which method the process times and the storage and transport costs can be reduced on manufacturing the components. Furthermore, it is an object of the present disclosure to suggest a corresponding advantageous shaping tool for manufacturing such a component.

The suggested shaping tool comprises a first tool half, a second tool half and at least one movable cylinder pin. The first half of the shaping tool is arranged opposite, for example above the second half of the shaping tool. The first half of the shaping tool and the second half of the shaping tool can be displaceable relative to one another. The second half of the shaping tool is typically designed for receiving a carrier element. The first half of the shaping tool further comprises at least one movable cylinder pin at a side which faces the second half. Therein, the cylinder pin can be arranged in a guide hole. Herein, an outer end of the cylinder pin points in the direction of the second half of the shaping tool and is movable in the direction of the second half of the shaping tool. A holding element for receiving a flat, bendable element is assembled on this outer end of the cylinder pin. The holding element can be assembled on the cylinder pin in a movable manner, preferably via a rotary joint or ball joint. The shaping tool preferably comprises several cylinder pins which are movable in the direction of the second half of the shaping tool and which at their outer end which points to the second half are each provided with a holding element. Embodiments of the shaping tool with at least three cylinder pins which are movable in such a manner for example have the advantage that the flat, bendable element can be bent into different shapes by way of a movement of individual cylinder pins and can be statically mounted at three points by way of holder. The holding element can be designed for example as a suction cup. Herein, the suction cups can have different shapes and the suction cups are typically circularly round or oval. A diameter of a circular suction cup is usually at least 5 mm, preferably at least 10 mm. The diameter of the suction cup is maximally usually 60 mm, preferably maximally 40 mm. At least one of the cylinder pins is coupled to a drive. The cylinder pin can be retracted into the first tool half, for example in the form of a guide hole and be extended out of this by way of this drive. Herein, the outer end of the cylinder pin, on which the holding element is arranged, is moved towards the second tool half on extending which is to say on moving out. For this, the cylinder pin can be designed for example telescopically, comprise a spring or be moved along a rail which is assembled in the guide hole or guide channel. Herein, the drive is typically an actuator, which for example is pneumatically, hydraulically, electrically or electromagnetically driven. Herein, the drive element is typically part of the first half of the shaping tool. In particular, it is advantageous if at least one cylinder pin is drivable independently of the other cylinder pin/pins. This has the advantage that a flat, bendable element which is received on the holding element can be bent into defined shape by way of a targeted driving and thus retraction and/or extension of the cylinder pins or of the cylinder pin. In particular, it is advantageous if the first half of the shaping tool has an as dense as possible pattern of guide holes with cylinder pins which are arranged therein. If each of these cylinder pins is individually drivable, for example each by way of an actuator, then the flat, bendable element can be bent into complex three-dimensional shapes by way of an individual activation of the individual cylinder pins. Furthermore, a pattern of cylinder pins which are arranged as densely as possible has the advantage that material stresses in the component to be bent can be kept as low as possible, since an as high as possible support effect can be realised by the many cylinder pins and local stresses in the flat, bendable element can be kept as low as possible. Damage in the form of breakage or other undesirable deformations can therefore be counteracted.

Usually, suction cups are applied as holding elements, whose functioning is based on a vacuum. Magnetic holding elements which fixedly hold the element by magnetic force can also be used in the case of a metallic, flat, bendable element. Magnetic holding elements can be designed for example as permanent magnets or as electromagnets.

The first tool half preferably comprises at least one clamping region and at least one pressing region. The cylinder pins with holding elements at their outer ends can then be arranged in the clamping region. The pressing region typically surrounds the clamping region. The bendable element and the carrier element are pressed onto one another and bonded, in the pressing region. A surface contour of the pressing region corresponds to a contour of the side of the bendable element which is away from the carrier element. The first tool half can also comprise several clamping regions which are encompassed or partly encompassed by pressing regions.

The suggested method has a shortened time expense compared to the state of the art. Since the process step of preshaping is integrated in the suggested shaping tool, the component can be manufactured in a reduced number of production steps and a reduced number of shaping tools. The methods of the state of the art further have the disadvantage of a more difficult transport and storage. In is particularly in the case of large distances between the production locations of the preshaping and the connection to the carrier part that the preshaped components need to be transported and intermediately stored. Herein, a space requirement of the preshaped elements is significantly increased in comparison to the initially flat shape of the component to be bent and a stackability of the elements is limited. Furthermore, the preshaped elements are mostly unstable and are exposed to the danger of damage, since the preshaped elements have not yet been stabilised by carrier parts. The suggested method and the suggested shaping tool counteract this disadvantage since the transport paths between the preshaping tool and the shaping tool are spared. The transportability is given by the shape of the bendable element which is flat until in the shaping process.

In embodiments, the surface contour of the clamping region corresponds to the contour of the side of the bendable element which is away from the carrier element. In embodiments, the clamping region comprises one or more guide holes. Usually, a cylinder pin which at its outer end comprises a holding element is assembled in each of these guide holes. The cylinder pins and holding elements can be sunk almost completely in the guide holes in the clamping region of the first tool half. The flat, bendable element can therefore be held in a bent condition by the holding elements, whilst the holding element can likewise be sunk in the guide holes. Preferably, the holding elements can be sunk in the guide holes in a manner such that each holding element terminates with a respective outer edge of the guide holes. The surface of the first half can therefore be arranged essentially planarly to a contact surface of the holding elements, wherein the contact surface of the holding elements is a surface of the holding elements which is in contact with the flat, bendable element. Furthermore, the first half of the shaping tool or a part of the first half of the shaping tool at a side which faces the second half of the shaping tool can be shaped in a manner such that it corresponds to the shape of the second half of the shaping tool and/or to the surface which faces the bendable element, of the carrier element which is held by the second half. This has the advantage that a surface of the flat, bendable element which faces the first half of the shaping tool, in a bent condition can bear at least partly on the surface of the first half of the shaping tool and the bent element can be supported by the cylinder pins as well as by the tool surface or carrier element surface.

The second half of the shaping tool, typically at the side which faces the first half comprises a cavity and/or receiving surface for receiving a carrier part. The cavity and/or the receiving surface is/are preferably designed in a manner such that it/they can receive a carrier part in the form of a frame. The carrier part can also be essentially flat or three-dimensional.

The first half of the shaping tool and/or the second half of the shaping tool can be movable in the direction of the respective other half of the shaping tool. By way of this, a carrier part which is arranged in the second half of the shaping tool can be pressed onto the bent element by way of a movement of the first and/or second half of the shaping tool towards the respective other half. An adhesive which is deposited onto the carrier element and/or the bent element between the carrier element and the bent element can connect the carrier element to the bent element. The adhesive can be for example a two-component adhesive, a hot-melt adhesive or a double-sided adhesive tape. The adhesive can comprise acrylic, epoxide or polyurethane. The carrier part is usually only connected to the bent element by way of bonding.

Concerning the suggested method for manufacturing a bent component, in embodiments, a shaping tool with a first half and with a second half is provided, for example a shaping tool of the type mentioned above.

A flat, bendable element is received by way of holding elements which are arranged on cylinder pins. Herein, the cylinder pins are arranged in the first half of the shaping tool in an extendable and retractable manner. The holding elements point in the direction of a second half of the shaping tool which is arranged opposite the first half of the shaping tool.

A further method step comprises the bending of the flat, bendable element by way of at last partial retraction or extension of at least one cylinder pin into and out of the first tool half respectively, in particular out of the clamping region of the tool half, for example out of the corresponding guide hole.

In a method step, a carrier element is arranged in the second half of the shaping tool in a manner such that a surface of the carrier element which at least in regions corresponds to the shape of the bent element faces the bendable element. The carrier element can therein be a frame, for example of plastic or also aluminium.

However, it can also be a flat or three-dimensional element, for example a deep-drawn element or a plate. The carrier element is typically essentially rigid.

Furthermore, an adhesive is deposited at least regionally onto a side of the carrier element which faces the bendable element and/or onto a side of the bendable element which faces the carrier element. Herein, the adhesive can be deposited by way of spraying, dripping off, casting, rolling, brushing, doctoring, putty-knife painting or punching.

The bendable element is pressed onto the carrier element. Herein, at least one of the halves of the shaping tool is moved in the direction of the respective other half of the shaping tool. Additionally or alternatively, the cylinder pins with the suction cups which are arranged thereon can also be extended.

A further method step comprises a curing of the adhesive. This can be effected passively, which is to say by way of the bent component comprising the carrier element and the bent element which are connected via an adhesive arranged therebetween, being left in the shaping tool, preferably in a condition in which they are pressed on one another. However, the adhesive can also be actively cured, for example by way of heating, by way of active cooling or drying, for example with the help of a blower.

The bent component is removed from the shaping tool after a curing. The method as well as the shaping tool is particularly advantageous since no preshaping process is necessary and the preshaping as well as the connecting of the bendable element to the carrier part can be realised in one method and in one tool.

If the cylinder pins with the holding elements are sunk in guide holes of a clamping region and are situated in a retracted condition, then the bent, flat bendable element typically bears at least partly on a surface of the upper half of the shaping tool.

In embodiments, the flat, bendable element is of glass or plastic. The cylinder pins permit a glass plate to be bent in a cold condition which is to say without heating the glass, at ambient temperature, thus roughly between 17° C. and 30° C., since the cylinder pins can lead away pressures and forces which are exerted upon the glass plate by the bending process. Stresses within the glass plate are therefore kept to a minimum and a bending process of cold glass plate or other brittle materials is rendered possible. Of course, other materials for the flat, bendable element are also conceivable, for example PP, glass fibres, aluminium, plastic, wood, stone, ceramic or acrylic glass. In embodiments, the thickness of the flat, bendable element is at least 0.01 mm, preferably at least 0.05 mm, particularly preferably at least 0.1 mm and/or maximally 3 mm, preferably maximally 2 mm, particularly preferable maximally 1 mm. A flat bendable element of glass can for example be 0.4 mm thick.

The features which are mentioned above and/or below with reference to the shaping tool can be conferred upon the method for manufacturing the bent component and vice versa. Furthermore, the features which are mentioned above and/or below with regard to the shaping tool or the method, can also be conferred upon the bent component.

The terms first, second etc. which are used in the present application merely serve for the description of the arrangement of the respective components relative to one another. The first half of the shaping tool and the second half of the shaping tool can be arranged for example above one another or also next to one another, assuming that a relative orientation relative to one another is maintained.

BRIEF DESCRIPTION OF THE DRAWINGS

Embodiment examples are described hereinafter by way of pictures. There are shown in.

DETAILED DESCRIPTION

Figure 1:
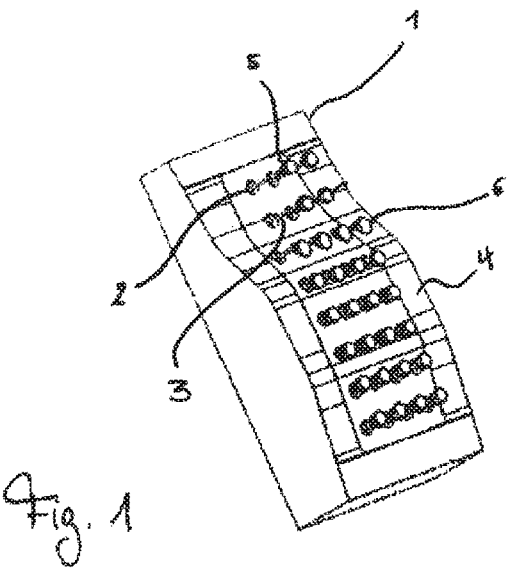
FIG. 1 a perspective view of a first half of a shaping tool.

A perspective view of a first half of a shaping tool is shown in FIG. 1. The first half of the shaping tool comprises a multitude of cylinder pins 3 which are arranged in guide holes 2 in the clamping region and project out of these. The cylinder pins 3 are retractably and extendably assembled in the guide holes 2 of the first half of the shaping tool and are each coupled to a drive element in the form of an actuator. The actuators are hydraulically drivable. The cylinder pins 3 are retractable and extendable independently of one another by the actuators. A cylinder head 5 is arranged at an outer end of the cylinder pins 3. The cylinder head 5 comprises a suction cup 6, with which a flat bendable component can be received. The surface 4 of the first half 1 of the shaping tool, in which surface the guide holes 2 are arranged, comprises a rolling, uneven shape which corresponds to that surface of the bent component.

Figure 2:
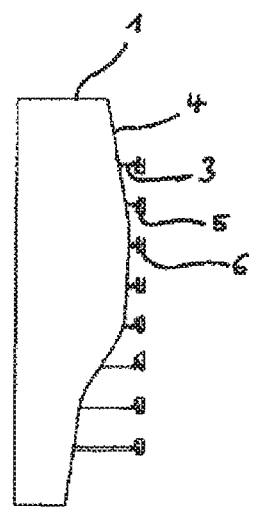
FIG. 2 a lateral view of the first half of the shaping tool.

FIG. 2 shows a lateral view of the first half 1 of the shaping tool of FIG. 1. Recurring features are provided with the same reference numerals in FIG. 2 and the following figures. The cylinder pins 3 are represented in a maximally extended condition. In this condition, a contact surface of the holding elements 6 lies on one plane, so that they can receive a flat, plane element. The contact surface of the holding elements is that surface, on which the holding elements receive the flat, bendable element. The cylinder pins 3 can be individually activated and retracted, so that the flat, bendable element can be bent into a defined shape. If the cylinder pins 3 are completely retracted into the first half 1 of the shaping tool, then the flat element is in a bent condition and with a surface which faces the first half bears on the surface 4.

Figure 3:
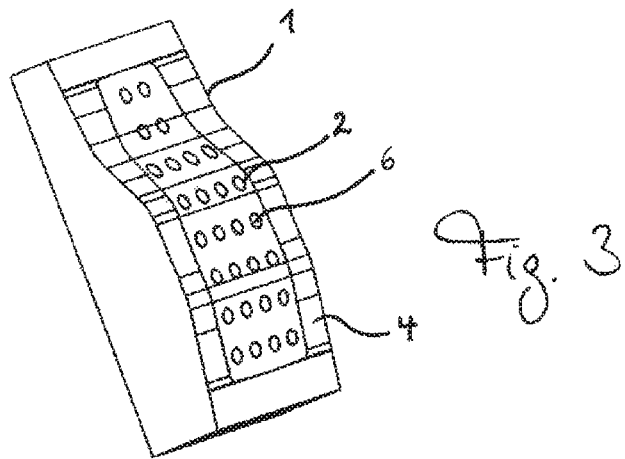
FIG. 3 a perspective view of the first half of the shaping tool given retracted cylinder pins, FIG. 4 a perspective view of an outer end of the cylinder pin with a holding element, FIG. 5 a sectioned view of the cylinder pin of FIG. 4, FIGS. 6 to 8 a schematic representation of a shaping tool in different stages of a manufacturing process of a component, FIG. 9(a) a schematic representation of a shaping tool with an inserted carrier part in the form of a frame, FIG. 9(b) a sectioned view of the shaping tool of FIG. 9(a) with an inserted carrier part, and FIG. 10 a sectioned view of a shaping tool.

FIG. 3 shows the first half 1 of the shaping tool in precisely that condition, in which the cylinder pins 3 are completely retracted into the first half 1 of the shaping tool and the suction cups 6 terminate with the outer end of the guide holes 2 in an essential planar manner. A bent element can therefore be supported by the first half 1 of the shaping tool and a pressing pressure can be exerted onto the bent element in a manner distributed over the surface 4. In some embodiments, the pressing pressure is 0.1 N/mm$^2$.

Figure 4:
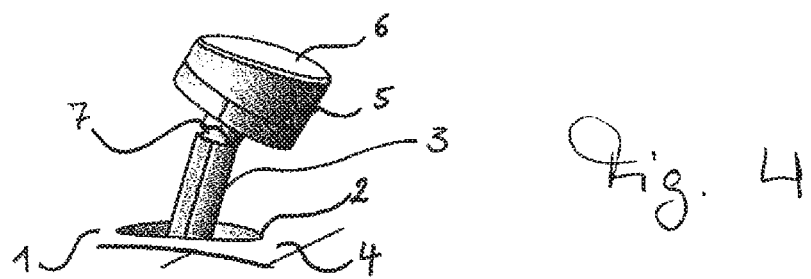

A perspective view of one of the cylinder pins 3 of FIGS. 1 to 3 is illustrated in FIG. 4. The cylinder head 5 is assembled on the outer end of the cylinder pin 3 in a tiltably movable manner by way of a rotation joint 7. Such a cylinder pin 3 can be retracted for example with the cylinder head 5 into a guide hole 2. In embodiments, the holding element 6 is designed as a suction cup. In embodiments, a diameter of the suction cup 6 is for example 330 mm. In embodiments, in its size, the guide hole corresponds to the diameter of the suction cup 6 and/or of the cylinder head 5.

Figure 5:
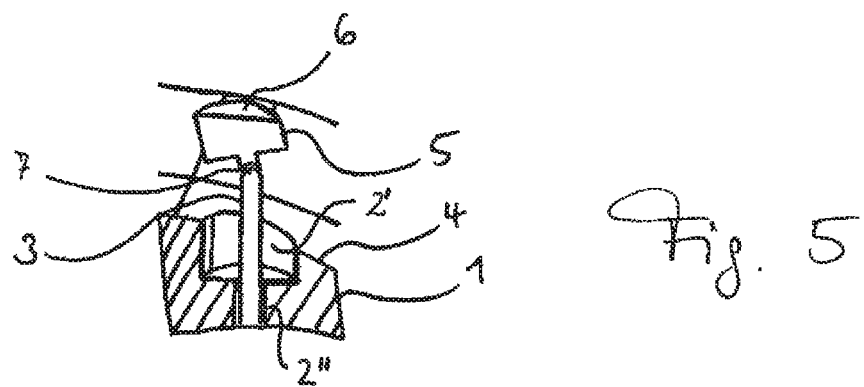

FIG. 5 shows a sectioned view of the first half 1 of the shaping tool, of the cylinder pin 3 and of the guide hole 2. The guide hole 2 comprises a recess 2' and a tapered bore 2". In the shown example, the diameter of the recess 2' of the guide hole is 35 mm and a diameter of the tapered bore 2" is 6 mm.

Figure 6:
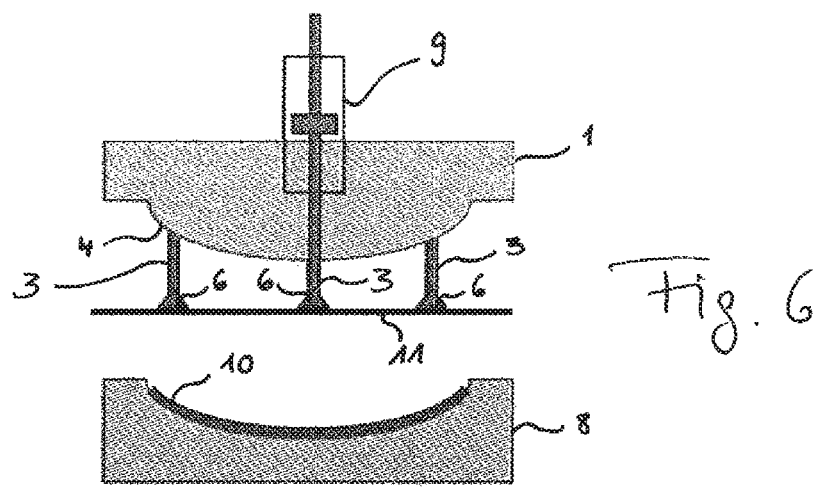
Figure 7:
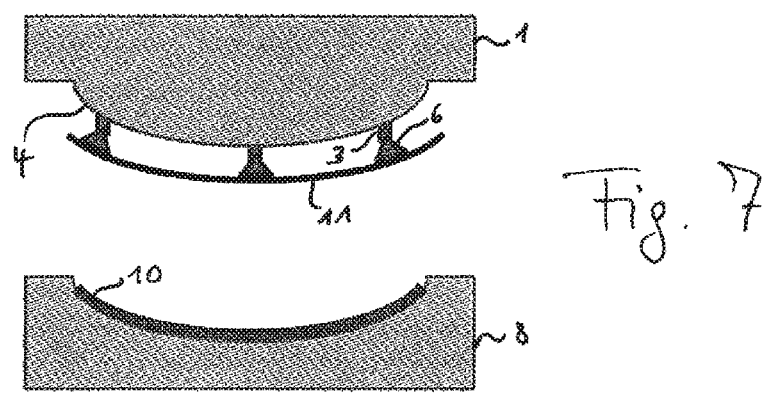
Figure 8:
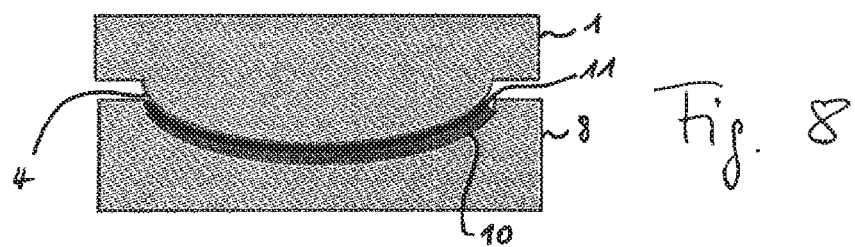

FIGS. 6 to 8 show a shaping tool comprising a first half 1 and a second half 8. Herein, the first half further comprises a multitude of cylinder pins 3, of which three cylinder pins 3 are represented by way of example. All cylinder pins are coupled to a drive element 9, wherein for a purpose of a better overview only one drive element 9 in the form of an actuator is represented. The cylinder pins 3 are retractable and extendable independently of one another by way of drive elements 9. The cylinder pins 3 at other outer ends each comprise a suction cup 6. The first half of the shaping tool which is shown in FIGS. 6, 7 and 8 with regard to its essential features corresponds to the first half 1 of the shaping tool which is shown in FIGS. 1 to 5. The shaping tools of FIGS. 1 to 5 and 6 to 8 differ in the number of cylinder pins and the shape of the surface 4. A carrier element 10 is arranged in the second half 8 of the shaping tool in FIGS. 6 to 8. The suction cups 6 hold a flat, bendable element 11. The element 11 is a glass plate. The cylinder pins are maximally extended in FIG. 6 and hold the glass plate in a manner such that this is present in an unbent manner. In FIG. 7, the cylinder pins 3 with the suction cups 6 are partly retracted into the first half 1 of the shaping tool, so that the glass plate is bent. In the representation of FIG. 8, the cylinder pins 3 and the suction cups 6 are completely sunk into the respective guide holes 2 of the first half 1 of the shaping tool. The glass plate is thereupon bent and bears on the surface 4 of the first half 1 of the shaping tool. The suction cups hold the glass plate in the bent form. An adhesive is deposited onto the carrier element 10, onto a surface which faces the flat, bendable element 11, for example by way of rolling. The first half 1 of the shaping tool is subsequently moved downwards, so that the bent glass plate is pressed onto the carrier element 10 with the deposited adhesive. After a curing of the adhesive, the first half 1 can be moved upwards and the finished, bent component comprising the carrier element 10 which is connected to the bent element by way of the adhesive can be removed from the second half 8.

FIG. 9 shows the shaping tool of FIGS. 6 to 8, wherein the carrier element 10 is present in the form of a frame 10'. The frame 10' is arranged in the second half 8 of the shaping tool. A sectioned lateral view is shown in FIG. 9(a), and FIG. 9(b) shows a sectioned view AA of the second half 8 of the shaping tool with an inserted frame. The flat, bendable element 10, here a glass plate, is bent and is subsequently pressed onto the carrier element 10, here the frame 10'. A component with a bent, framed glass surface can thus be manufactured. In particular, such a component can be used as a vehicle interior trim part, for example as a display covering or as a covering for decorative elements and/or functional displays. Other applications possibilities are also conceivable.

Figure 10:
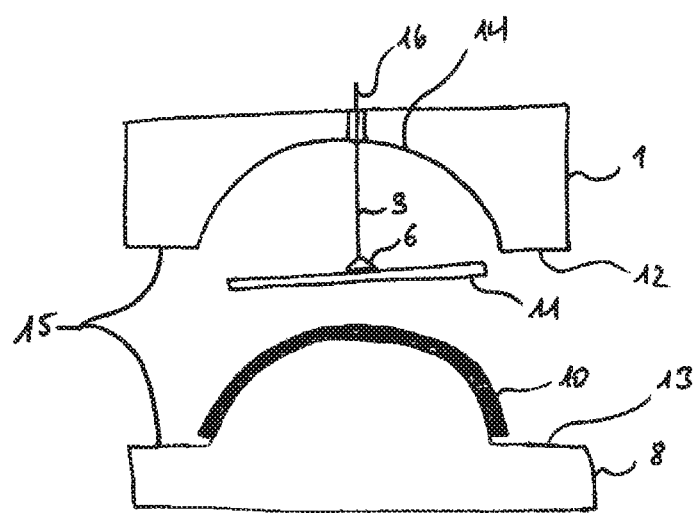

FIG. 10 shows a shaping tool whose first half corresponds essentially to the first half 1 of the shaping tool which is shown in FIG. 2. The middle part of the side of the first half 1, said side facing the second half 8, is however deepened, so that the first half 1 of the shaping tool comprises a raised edge 12 in the direction of the second half of the shaping tool. The second half of the shaping tool comprises a prominence in the corresponding middle part of the side, said side facing the first half. The second half comprises a second edge 13 around this prominence. The middle part of the first half of the shaping tool forms a clamping region. 14. The edges 12, 13 of the first and second half form the pressing region 15. A cylinder pin 3 which is fastened to a rod assembly 16 is arranged in the clamping region 14 of the first half. The cylinder pin 3 comprises a holding element, for example a magnetic holding element 6, with which the bendable element 11 is held. A pressing pressure upon the bendable element 11 is exerted only or predominantly by the edge 12, 13 which shapes the pressing region 15. The bendable element 11 can be pulled against the first half and bent by way of the retraction of the cylinder pins. The bent element can be connected to the carrier part 10 by way of an adhesive by way of moving the first 1 and the second half 8 together.

I claim:

1. A method for manufacturing a component for use in a vehicle interior, comprising the following steps:
receiving a flat, bendable element by way of at least one holding element which is arranged in a movable manner on a cylinder pin, wherein the cylinder pin is extendably and retractably arranged in a guide hole in a first half of a shaping tool, and the holding element points in the direction of a second half of the shaping tool which is arranged opposite the first half of the shaping tool, wherein the holding element is sinkable into the guide hole such that the holding element terminates with an outer edge of the guide hole in an essentially planar manner along a length of the outer edge of the guide hole;
bending the flat, bendable element by way of at least partial retraction or extension of the cylinder pin into the first half of the shaping tool and out of the first half of the shaping tool respectively to provide a bent element;
arranging a carrier element on the second half of the shaping tool in a manner such that a surface of the carrier element which at least regionally corresponds to the shape of the bent element faces the bendable element;
at least regional depositing of an adhesive onto a side of the carrier element which faces the bendable element and/or onto a side of the bendable element which faces the carrier element;
pressing the bendable element onto the carrier element by way of moving at least one of the halves of the shaping tool in the direction of the respective other half of the shaping tool and/or by way of extending the holding element; and
curing the adhesive.

2. The method according to claim 1, wherein the flat, bendable element is received by way of at least three holding elements which are arranged on cylinder pins.

3. The method according to claim 1, wherein the flat, bendable element bears on a surface of the first half of the shaping tool in a retracted condition of the at least one of the cylinder pins.

4. The method according to claim 1, wherein the flat, bendable element is a glass plate.

5. The method according to claim 1, wherein the at least one holding element is arranged in the movable manner on the cylinder pin via a rotary joint or a ball joint.

6. The method according to claim 1, wherein the holding element is a suction cup or a magnetic holding element.

7. A method for manufacturing a component for use in a vehicle interior, comprising the following steps:
receiving a flat, bendable element by way of at least one holding element which is arranged in a movable manner on a cylinder pin, wherein the cylinder pin is extendably and retractably arranged in a guide hole in a first half of a shaping tool, and the holding element points in the direction of a second half of the shaping tool which is arranged opposite the first half of the shaping tool, wherein the holding element is sinkable into the guide hole such that the holding element terminates with an outer edge of the guide hole in an essentially planar manner along a length of the outer edge of the guide hole;
bending the flat, bendable element by way of at least partial retraction of the cylinder pin into the first half of the shaping tool, and thereby pulling the flat, bendable element against the first half of the shaping tool, to provide a bent element;
arranging a carrier element on the second half of the shaping tool such that a surface of the carrier element faces the first half of the shaping tool;
at least regionally depositing an adhesive onto the surface of the carrier element that faces the first half of the shaping tool and/or onto a side of the bent element which faces the carrier element;
after bending the flat, bendable element to provide the bent element and at least regionally depositing the adhesive, pressing the bent element onto the carrier element by way of moving at least one of the halves of the shaping tool in the direction of the respective other half of the shaping tool; and
curing the adhesive.

\* \* \* \* \*